United States Patent [19]

Hirotsuji et al.

[11] Patent Number: 5,413,672
[45] Date of Patent: May 9, 1995

[54] METHOD OF ETCHING SENDUST AND METHOD OF PATTERN-ETCHING SENDUST AND CHROMIUM FILMS

[75] Inventors: Eigo Hirotsuji, Konan; Naoya Fukuda, Aichi, both of Japan

[73] Assignee: NGK Insulators, Ltd., Japan

[21] Appl. No.: 90,939

[22] Filed: Jul. 14, 1993

[30] Foreign Application Priority Data

Jul. 22, 1992 [JP] Japan .................. 4-216297
Jul. 22, 1992 [JP] Japan .................. 4-216298

[51] Int. Cl.$^6$ .............................................. B44C 1/22
[52] U.S. Cl. ........................................ 216/87; 216/99; 216/103; 216/51
[58] Field of Search ............... 156/664, 630, 645, 633, 156/609

[56] References Cited

U.S. PATENT DOCUMENTS

| | | | |
|---|---|---|---|
| 4,890,378 | 1/1990 | Suzuki | 29/603 |
| 4,948,460 | 8/1990 | Sandaiji | 156/630 |
| 5,084,129 | 1/1992 | Fukuda et al. | 156/634 |
| 5,189,586 | 2/1993 | Pisharody | 360/126 |
| 5,195,004 | 3/1993 | Okuda | 36/126 |

FOREIGN PATENT DOCUMENTS

| | | |
|---|---|---|
| 61-104307 | 5/1986 | Japan . |
| 63-094429A | 4/1988 | Japan . |
| 2-295104 | 12/1990 | Japan . |
| 3-237605 | 10/1991 | Japan . |
| 032337605 | 10/1991 | Japan . |

OTHER PUBLICATIONS

Van Nostrand Reinhold Encyclopedia of Chemistry, 4th Ed. 1984 p. 95.

*Primary Examiner*—R. Bruce Breneman
*Assistant Examiner*—Joni Y. Chang
*Attorney, Agent, or Firm*—Parkhurst, Wendel & Rossi

[57] ABSTRACT

An etching method for etching a sendust film formed on a substrate is disclosed. In this method, a mixture of acid solutions of nitric acid and hydrochloric acid is used as an etching liquid. The etching is desirably effected while the sendust film is directly or indirectly held in electrical connection with a ferrite member, with an area of a portion of the ferrite member which contacts the etching liquid being twice to twelve times a total area of etched portions of the sendust film. Also disclosed is a method for pattern-etching a sendust film, and a chromium base film formed between the sendust film and a substrate, which includes the steps of: (a) etching the sendust film to form a predetermined sendust pattern; and (b) etching the chromium base film to form a chromium pattern which conforms to the predetermined sendust pattern, such that the chromium base film is directly or indirectly held in electrical connection with a chromium bulk.

20 Claims, 6 Drawing Sheets

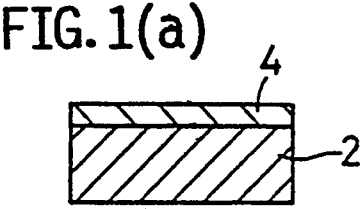
FIG. 1(a)
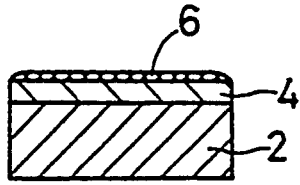
FIG. 1(b)
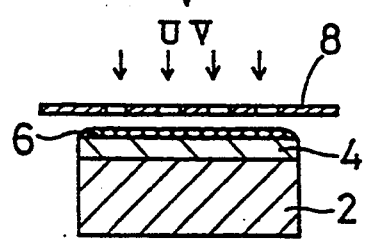
FIG. 1(c)
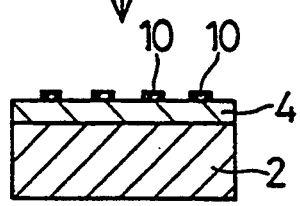
FIG. 1(d)
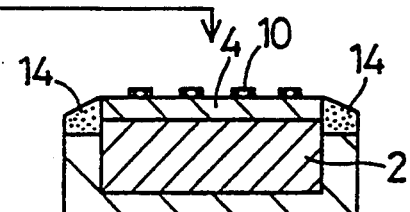
FIG. 1(e)
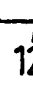
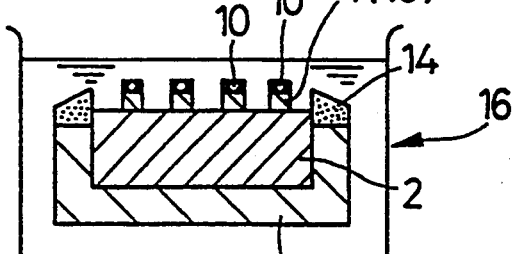
FIG. 1(f)
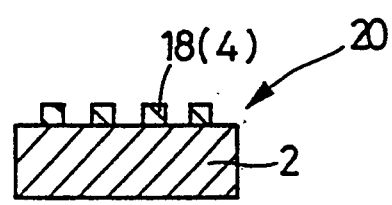
FIG. 1(g)

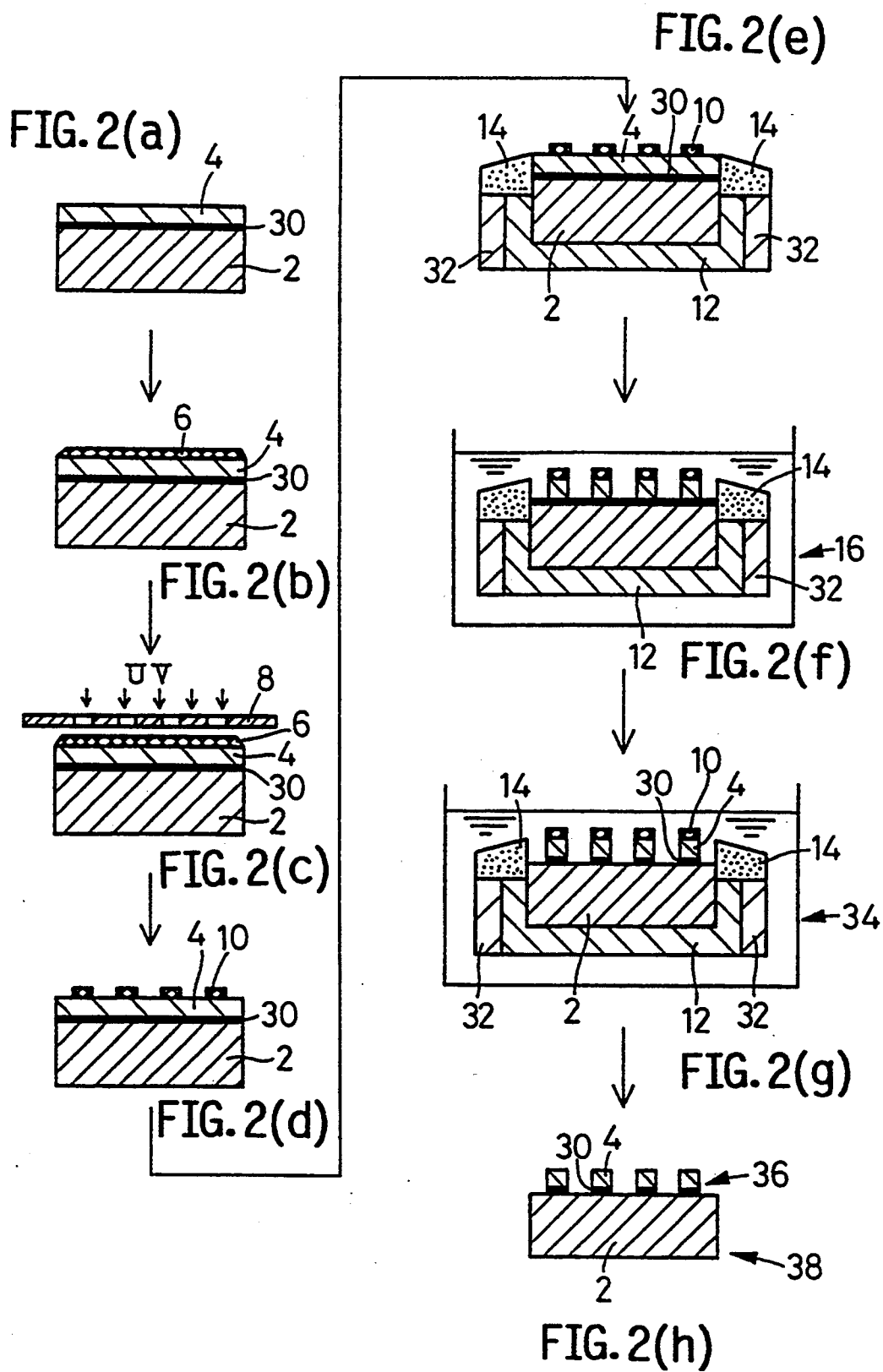

METHOD OF ETCHING SENDUST AND METHOD OF PATTERN-ETCHING SENDUST AND CHROMIUM FILMS

BACKGROUND OF THE INVENTION

1. Field of the Invention

The present invention relates in general to a method of etching sendust, and more particularly to a technique for effectively etching a sendust film formed on a substrate. The invention is also concerned with a method of pattern-etching sendust and chromium films, and more particularly with a technique for effectively etching a chromium base film to form a pattern which precisely conforms to a predetermined sendust pattern formed by etching the sendust film.

2. Discussion of the Related Art

Sendust, i.e., Fe—Si—Al alloy, is well known as a metallic magnetic material, and has been used for various applications. For example, sendust is used for forming a metallic magnetic layer which is provided in a magnetic gap of a composite type magnetic head core, as disclosed in U.S. Pat. No. 5,084,129. This magnetic head core having a so-called metal-in-gap (MIG) structure is suitably used for recording information on a magnetic recording medium having a high coercive force.

As one of a series of process steps for fabricating the composite type magnetic head core of the above type, for example, a sendust film with a suitable thickness is formed on a suitable substrate by sputtering or other technique, and is then subjected to a chemical etching or other treatment. In this process step, it is particularly important to form the sendust film into a predetermined pattern with high accuracy, by utilizing a photolithography technique in combination with the etching treatment.

In the meantime, there have been only few reports on methods of etching a sendust film formed on a substrate. For example, a sendust material may be etched by using a solution of phosphorous acid (10%) and pure water, as proposed in JP-A-61-104307, or using an etching liquid which consists of a 30% nitric acid solution, as proposed in JP-A-3-237605.

Having studied the above etching methods, however, the inventors of the present invention found that the use of the solution of phosphorous acid (10%) and pure water involves some problems, such as a slow etching speed, low stability and poor reproducibility. It was also recognized by the inventors that the use of the 30% nitric acid solution for etching sendust involves some problems, such as a considerably slow etching speed, e.g., about 0.0053 $\mu$m/min., and poor conformity of edges of etched portions of the sendust film to those of the predetermined pattern.

In order to improve the adhesion of the sendust film with respect to the substrate which bears the film thereon, it is proposed in JP-A-2-295104 to form a base film, such as a chromium film, on the substrate, and then form the sendust film on the base film. In this case, the chromium base film as well as the sendust film needs to be patterned by etching, such that a pattern obtained from the base film conforms to or coincides with a pattern obtained from the sendust film. Namely, after the sendust film formed on the base film is etched to form a predetermined pattern, the chromium base film is etched into a pattern corresponding to that of the sendust film.

However, the chromiun base film tends to be etched to a larger extent than expected whereby the pattern formed by the base film is made smaller than the predetermined sendust pattern. In some cases, the chromium base film located under the sendust pattern is excessively etched, whereby the patterned sendust film may be undesirably peeled off or separated from the base film.

SUMMARY OF TEE INVENTION

The present invention was developed in the light of the above situations. It is therefore a first object of the present invention to provide a method of etching a sendust film in a significantly reduced time.

It is a second object of the invention to provide a method of etching a chromium base film on which a sendust film is formed, so that a pattern obtained from the chromium base film conforms to that obtained from the sendust film, without suffering from excessive reduction in the size of the chromium pattern as compared with that of the sendust pattern.

The first object may be attained according to a first aspect of the present invention, which provides an etching method for etching a sendust film formed on a substrate, wherein a mixture of acid solutions of nitric acid and hydrochloric acid is used as an etching liquid. The use of the mixture of such acid solutions as the etching liquid leads to an effectively improved etching speed, enabling the etching operation to be accomplished within a relatively short time.

During the etching of the sendust film, it is preferable that the sendust film is directly or indirectly held in electrical connection with a ferrite member, and that an area of a portion of the ferrite member which contacts the etching liquid is twice to twelve times a total area of etched portions of the sendust film. As a result, the sendust film can be etched into a desired pattern in a relatively short time with improved accuracy, assuring improved pattern reproducibility and excellent conformity of edges of etched portions of the film to those of the desired pattern.

The above-indicated second object of the invention may be attained according to a second aspect of the present invention, which provides an etching method for pattern-etching a sendust film, and a chromium base film formed between the sendust film and a substrate, comprising the steps of: etching the sendust film to form a predetermined sendust pattern; and etching the chromium base film to form a chromium pattern which conforms to the predetermined sendust pattern, with the chromium base film being directly or indirectly held in electrical connection with a chromium bulk.

When the etching of the sendust and chromium films is effected according to the above-described method, the chromium pattern formed by the chromium base film is given substantially the same size as the sendust pattern formed by the sendust film, without suffering from otherwise possible reduction in the size of the chromium pattern. Thus, the sendust and chromium patterns corresponding to a desired predetermined pattern can be formed with high accuracy and high pattern reproducibility. Further, the sendust pattern thus formed is favorably prevented from being peeled off or separated from the substrate.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 1 is a series of views showing part of process steps for producing a magnetic head core, which include the steps utilizing photolithography and one embodiment of a sendust-etching method of the present invention, for etching a sendust film;

FIG. 2 is a series of views showing part of process steps for producing a magnetic head core, which include the steps utilizing photolithography and another embodiment of an etching method of the present invention, for etching a sendust film and a chromium base film;

DETAILED DESCRIPTION OF THE PRESENT INVENTION

Figure 3:
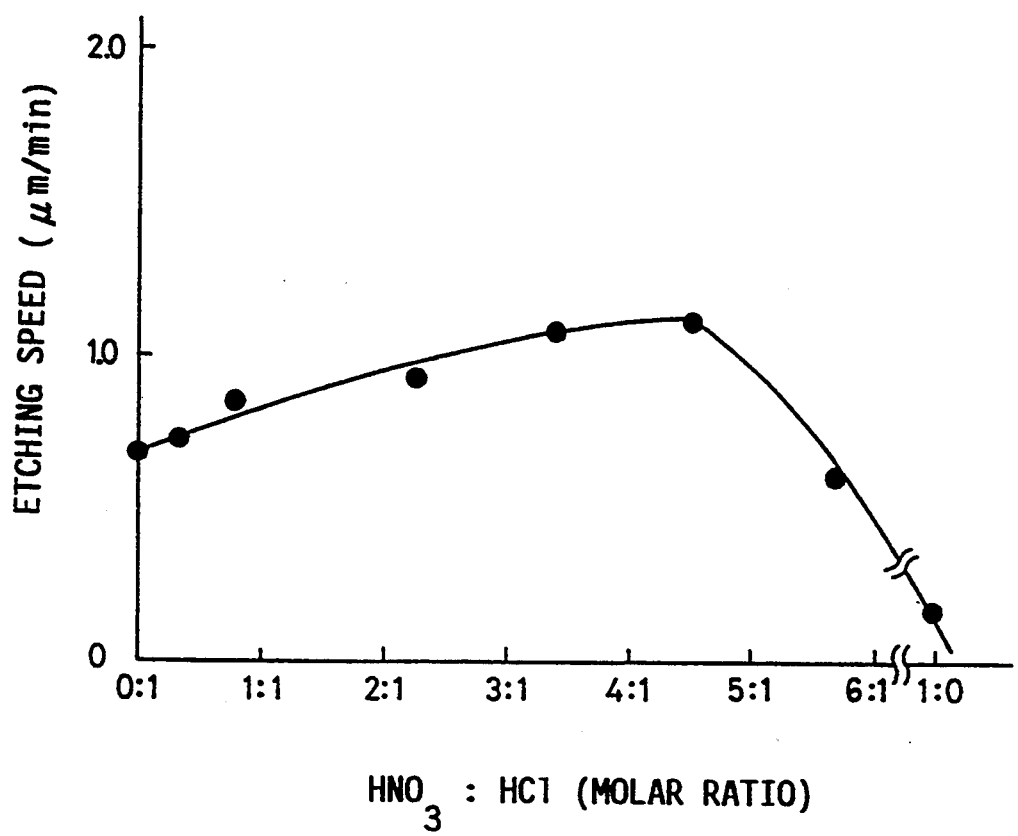
FIG. 3 is a graph indicating the etching speeds measured when a sendust film formed on a ferrite substrate of Example 1 was subjected to an etching operation using a mixture of acid solutions having various ratios of nitric acid to hydrochloric acid.

In the first aspect of the present invention, the mixture of acid solutions of nitric acid and hydrochloric acid is used as an etching liquid for sendust films, so as to achieve a remarkably increased etching speed. The proportion of nitric acid to hydrochloric acid contained in the etching liquid is suitably determined depending upon a desired etching speed. Preferably, the mixture of the acid solutions used as an etching liquid is prepared such that the molar ratio of hydrochloric acid to nitric acid is within a range of about 1:1 to 1:5.5, so as to assure sufficiently high conformity of edges of etched portions of the sendust film to those of a predetermined pattern. The etching liquid is generally prepared by mixing concentrated nitric acid and concentrated hydrochloric acid in an appropriate proportion. The acid concentrations of respective acid solutions to be mixed are suitably determined, such that the nitric acid solution contains at least 40% by weight of the nitric acid, and such that the hydrochloric acid solution contains at least 24% by weight of the hydrochloric acid.

According to a preferable feature of the present invention, the sendust film formed on a given substrate is etched while it is directly or indirectly held in electrical connection with a member made of a ferrite material, such as Mn—Zn ferrite, so that the sendust film as well as the ferrite member establishes a corrosion potential during the etching operation. Consequently, the etching speed can be increased, and the sendust film can be patterned with high accuracy and high reproducibility, assuring improved conformity of edges of etched portions of the film to those of the desired predetermined pattern.

The electrical connection between the sendust film and the ferrite member may be achieved by various known methods. For instance, these sendust film and ferrite member may be directly connected to each other by means of an electrically conductive material, such as carbon paste. In the case of producing a magnetic head core, in particular, the substrate may be formed of a ferrite core material, on which the sendust film is to be formed. With a suitable ferrite member electrically connected to the core material of the substrate, an indirect electrical connection is established between the sendust film and the ferrite member. Thus, the sendust film formed on a suitable substrate is directly or indirectly held in electrical connection with a suitable ferrite member by appropriate means.

While the sendust film and ferrite member are held in electrical connection with each other as described above, the etching operation is desirably effected such that an area of a portion of the ferrite member which contacts the etching liquid is twice to twelve times a total area of etched portions of the sendust film, so that a desired sendust pattern is formed in a relatively short time, with high accuracy and high reproducibility. If the contact area of the ferrite member with the etching liquid is less than twice or more than twelve times the total area of the etched portions of the sendust film, the conformity of the edges of the etched portions to those of the desired pattern may deteriorate.

The above-indicated ferrite member may be located on side faces of the substrate or may be disposed so as to surround the substrate. In producing the magnetic head core as described above, the substrate formed of a ferrite core material may partially contact the etching liquid during the etching operation. In this case, a sum of the contact areas of the core material and the ferrite member with the etching liquid is set to be twice to twelve times the total area of the etched portions of the sendust film. If the contact area of the ferrite core material (substrate) with the etching liquid is sufficiently large, the core material may serve as the ferrite member adapted to be electrically connected to the sendust film.

When a chromium base film is interposed between the substrate and the sendust film so as to enhance the adhesion of the sendust film to the substrate, the sendust film formed on the chromium base film is first subjected to a chemical etching to form a predetermined sendust pattern, in the manner as described above, and the chromium base film remaining on the substrate is then subjected to a chemical etching so as to form a pattern that conforms to the predetermined sendust pattern. In the second aspect of the present invention, the etching of the chromium base film is effected while the film is directly or indirectly held in electrical connection with a suitable chromium bulk, so that the predetermined sendust pattern can be reproduced with high accuracy on the pattern formed by the chromium base film. That is, the chromium pattern formed by the chromium base film substantially coincides with the sendust pattern formed on the base film.

The electrical connection between the chromium base film and the chromium bulk may be established in a similar manner to the electrical connection between the sendust film and the ferrite material as described above. For instance, a suitable chromium material (bulk) consisting of chromium or chromium-based alloy may be located on side faces of the substrate or may be disposed so as to surround the substrate. This chromium material (bulk) may be directly connected to the chromium base film by means of an electrically conductive material, such as carbon paste, or indirectly connected to the base film through the substrate or ferrite member. The chemical etching of the chromium base film is conducted using a known etching liquid, under ordinary etching conditions.

Referring first to FIG. 1 showing relevant steps (a) through (g) in the process of fabricating a magnetic head core, there will be described in detail one embodiment of the etching method of the present invention, for etching a sendust film formed on a substrate of the head core.

Initially, in the step (a) shown in FIG. 1, a sendust film 4 is formed with a suitable thickness on a substrate 2 formed of a magnetic material such as ferrite, or a non-magnetic material such as calcium titanate or glass, for example. This sendust film 4 is made of Sendust or Fe—Si—Al alloy, and is formed on the substrate 2 by a known method such as vacuum vapor deposition, ion-plating, CVD, sputtering, plating or other techniques. Among these techniques, sputtering is most preferred. As well known in the art, Sendust is a magnetic alloy composed of Fe, Si and Al, which has substantially no crystalline magnetic anisotropy and no magnetostriction, and which exhibits high permeability and high magnetic flux density. A typical composition of this material is 9.6% Si, 5.4% Al and the balance being Fe. To this sendust alloy, there may be added as needed an element or elements such as Cr, Ti and Ta, as well known in the art.

In the next step (b) of FIG. 1, a photoresist 6 (of a positive type in this embodiment) is applied by a known coating method to the sendust film 4 formed on the substrate 2, and then dried. In the following step (c) of FIG. 1, the photoresist 6 is exposed to a radiation through a photomask 8 having a desired pattern, and then developed and rinsed, so that a predetermined resist pattern 10 corresponding to the pattern of the photomask 8 is formed on the sendust film 4 in the step (d) of FIG. 1.

In the next step (e) of FIG. 1, a ferrite member 12 formed of a Mn—Zn ferrite is disposed so as to surround the substrate 2 on which the sendust film 4 and resist pattern 10 are formed as described above. The substrate 2 and sendust film 4 are electrically connected to the ferrite member 12, through an electrically conductive material in the form of a carbon paste 14. In this condition, the area of the outer surface of the ferrite member 12 (which is to contact an etching liquid) is twice to twelve times a total of local areas of the sendust film 4 which are not covered by the resist pattern 10, that is, the total area of local portions of the film 4 which are to be etched.

In the next step (f) of FIG. 1, an assembly of the substrate 2, sendust film 4, ferrite member 12 and others as obtained in the step (e) is immersed in an etching liquid received in an etching bath 16, for a predetermined period of time. The etching liquid consists of a mixture of acid solutions of nitric acid and hydrochloric acid. After etching the sendust film 4 in this manner, the assembly is washed in water, and the resist pattern 10 is removed or peeled off, followed by cleaning of the others. Consequently, an etched product 30 is obtained in the step (g) of FIG. 1, in which a predetermined sendust pattern 18 corresponding to the resist pattern 10 is formed on the substrate 2.

Since the mixture of the acid solutions of nitric acid and hydrochloric acid is used as the etching liquid as described above, the etching speed can be effectively increased, in other words, a comparatively short period of time is required for etching the sendust film 4. Further, in this embodiment, the sendust film 4 is directly or indirectly held in electrical connection with the ferrite member 12 during the etching operation, and the area of a portion of the ferrite member 12 which contacts the etching liquid is determined to be twice to twelve times the total area of the local portions of the sendust film 4 which are not covered by the resist pattern 10. Accordingly, the etching can be effected with improved stability, so as to form the sendust pattern 18 with high reproducibility and high accuracy, assuring improved conformity of edges of the sendust pattern 18 to those of the predetermined resist pattern 10.

Referring next to FIG. 2 showing relevant steps (a) through (h) in the process of fabricating a magnetic head core, there will be described in detail a method of pattern-etching sendust and chromium films as another embodiment of the present invention.

Initially, in the step (a) as shown in FIG. 2, a chromium base film 30 and a sendust film 4 are successively formed on a substrate 2 formed of a magnetic material such as ferrite, or a non-magnetic material such as calcium titanate or glass, for example. The chromium base film 30 having a thickness of about 50 to 200 Å is provided for the I purpose of improving the adhesion of the sendust film 4 to the substrate 2. While the chromium base film 30 as well as the sendust film 4 may be formed on the substrate 2 by any known method, such as vacuum vapor deposition, ion-plating, CVD, sputtering, plating or other techniques, the sputtering process is generally preferred. The sendust film 4 is formed of a sendust material or Fe—Si—Al alloy having a known composition, and may further contain as needed a suitable amount of an element or elements, such as Cr, Ti and Ta, as well known in the art.

In the next step (b) of FIG. 2, a photoresist 6 is applied by a known coating method to the sendust film 4 formed on the substrate 2 via the chromium base film 30, and then dried. In the following step (c) of FIG. 2, the photoresist 6 is exposed to a radiation through a photomask 8 having a desired pattern, and then developed and rinsed, so that a predetermined resist pattern 10 corresponding to the pattern of the photomask 8 is formed on the sendust film 4 in the step (d) of FIG. 2.

In the next step (e) shown in FIG. 2, a ferrite member 12 formed of a Mn—Zn ferrite, for example, is disposed so as to surround the substrate 2 on which the sendust film 4 and resist pattern 10 are formed as described above. Further, a chromium bulk 32 formed of chromium or chromium-based alloy is disposed outside the ferrite member 12. The substrate 2, chromium base film 30, and sendust film 4 are electrically connected to the ferrite member 12 and chromium bulk 32, through an electrically conductive material in the form of a carbon paste 14.

In the next step (f) of FIG. 2, an assembly as obtained in the step (e) of the substrate 2, chromium base film 30, sendust film 4, ferrite member 12, chromium bulk 32 and others is immersed in an etching liquid received in an etching bath 16, for a predetermined period of time. The etching liquid consists of a mixture of acid solutions of nitric acid and hydrochloric acid. In this manner, the sendust film 4 is chemically etched, to thereby form a sendust pattern corresponding to the predetermined resist pattern 10.

After etching the sendust film 4 in the manner as described above, the same assembly is immersed for a given period of time, in a known chromium-etching liquid, such as that having a composition of $Ce(NH_4)_2(NO_3)_6 + HClO_4 + H_2O$, in the step (g) as shown in FIG. 2, to effect chemical etching on the chromium base film 30. Thereafter, the assembly is washed in water, and the resist pattern 10 is removed or peeled off, followed by cleaning of the others. Then, the ferrite member 12 and the chromium bulk 32 are removed, whereby an etched product 38 is obtained in the step (h) of FIG. 2, in which a predetermined sendust-chromium pattern 36 corresponding to the resist pattern 10 is formed on the substrate 2.

With the sendust film 4 and chromium base film 30 successively etched to form the respective patterns in the manner as described above, the size of the pattern obtained from the chromium base film 30 is controlled to be close to that of the pattern obtained from the sendust film 4, effectively avoiding the conventional problem of reduction in the size of the chromium pattern. Consequently, the sendust-chromium pattern 36 can be formed on the substrate 2 with high accuracy and high reproducibility.

EXAMPLES

There will be hereinafter described some examples of the present invention, to further clarify the concept of the present invention. However, it is to be understood that the invention is not limited to the details of the illustrated examples of the invention, but may be embodied with various changes, modifications and improvements, which may occur to those skilled in the art, without departing from the spirit and scope of the invention defined in the appended claims.

EXAMPLE 1

Initially, a film made of a sendust alloy having a composition of 84.5% Fe-5.5% Al-10% Si was formed by sputtering on a substrate made of Mn—Zn ferrite or $CaTiO_3$. Then, the thus formed sendust film was subjected to an etching operation for two minutes in an etching liquid kept at 20° C. As the etching liquid, several samples of mixtures of acid solutions having different ratios of nitric acid to hydrochloric acid were used. Specifically, a 61% solution of nitric acid and a 36% solution of hydrochloric acid were used to prepare the samples having varying ratios of these two acid solutions.

Figure 4:
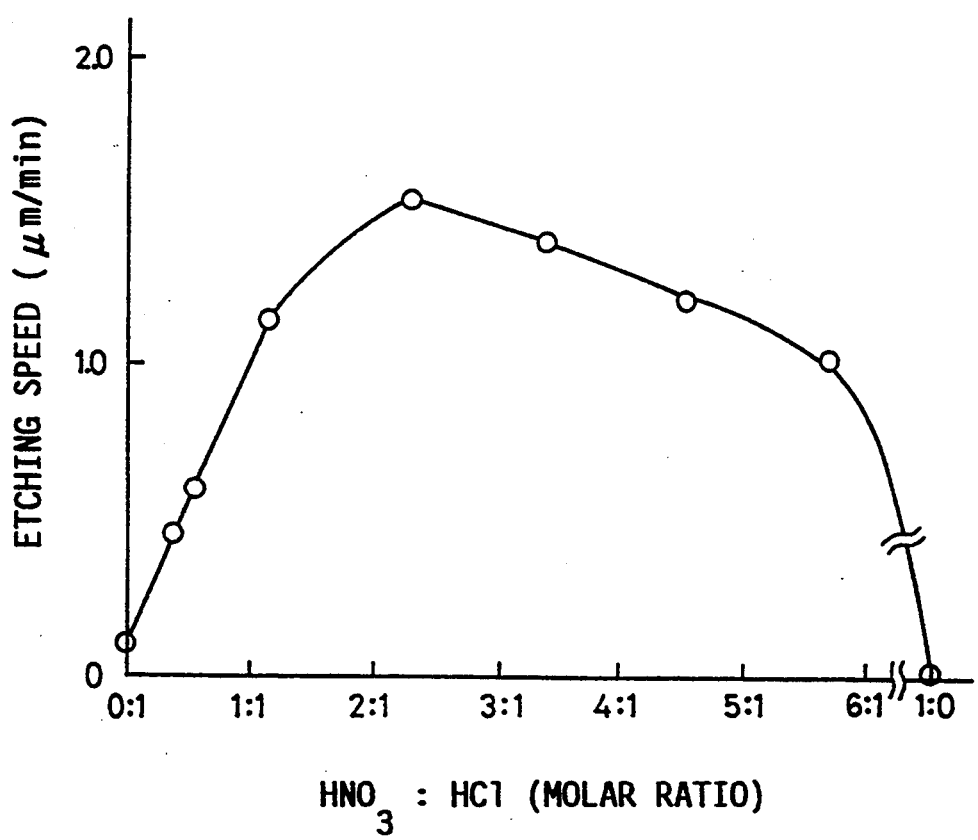
FIG. 4 is a graph indicating the etching speeds measured when a sendust film formed on a $CaTiO_3$ substrate of Example 1 was subjected to an etching operation using a mixture of acid solutions having various ratios of nitric acid to hydrochloric acid.

The graphs of FIG. 3 and FIG. 4 indicate the relationship between the molar ratios of nitric acid to hydrochloric acid in the respective samples of etching liquids, and etching speeds measured when the respective etching liquids were used. FIG. 3 shows the results obtained upon etching of the sendust film formed by sputtering on the ferrite substrate, while FIG. 4 shows the results obtained upon etching of the sendust film formed by sputtering on the $CaTiO_3$ substrate.

It will be understood from the graphs of FIG. 3 and FIG. 4 that the use of the mixture of the acid solutions of nitric acid and hydrochloric acid is advantageous over the use of nitric acid or hydrochloric acid alone. Namely, the use of the mixture of the acid solutions according to the invention leads to favorably increased etching speeds. In particular, further improvements in the etching speed were achieved when the ratio (molar ratio) of nitric acid to hydrochloric acid was held within a range of 1:1 to 5.5:1. It was also recognized that the use of an etching liquid whose ratio of nitric acid to hydrochloric acid was in a range of 0:1 to 1:1 involved some problems, such as relatively poor conformity of edges of etched portions of the sendust film to those of a desired predetermined pattern, and relatively low resistance of a resist to the etching liquid.

EXAMPLE 2

A sendust film 4 having a composition of 84.5% Fe-5.5% Al-10% Si was formed by sputtering on a ferrite (Fe—Mn—Zn) substrate 2, and a predetermined resist pattern 10 was then formed on the sendust film 4, according to the process steps (a) through (d) as shown in FIG. 1. Then, a Mn—Zn ferrite member 12 was disposed to surround the ferrite substrate 2, and was electrically connected to the ferrite substrate 2 and sendust film 4 through a carbon paste 14, as shown at (e) in FIG. 1.

Subsequently, the ferrite substrate 2, sendust film 4 and Mn—Zn ferrite member 12 were immersed for 100 seconds, in a mixture of acid solutions of nitric acid and hydrochloric acid ($HNO_3:HCl=4:1$), which was kept at 30° C. Thus, the etching on the sendust film 4 was effected. The graph of FIG. 5 shows the etching speeds measured when the ratio of the area of a portion of the Mn—Zn ferrite member 12 which contacts the etching liquid to the area of etched portions of the sendust film 4 was varied.

Figure 5:
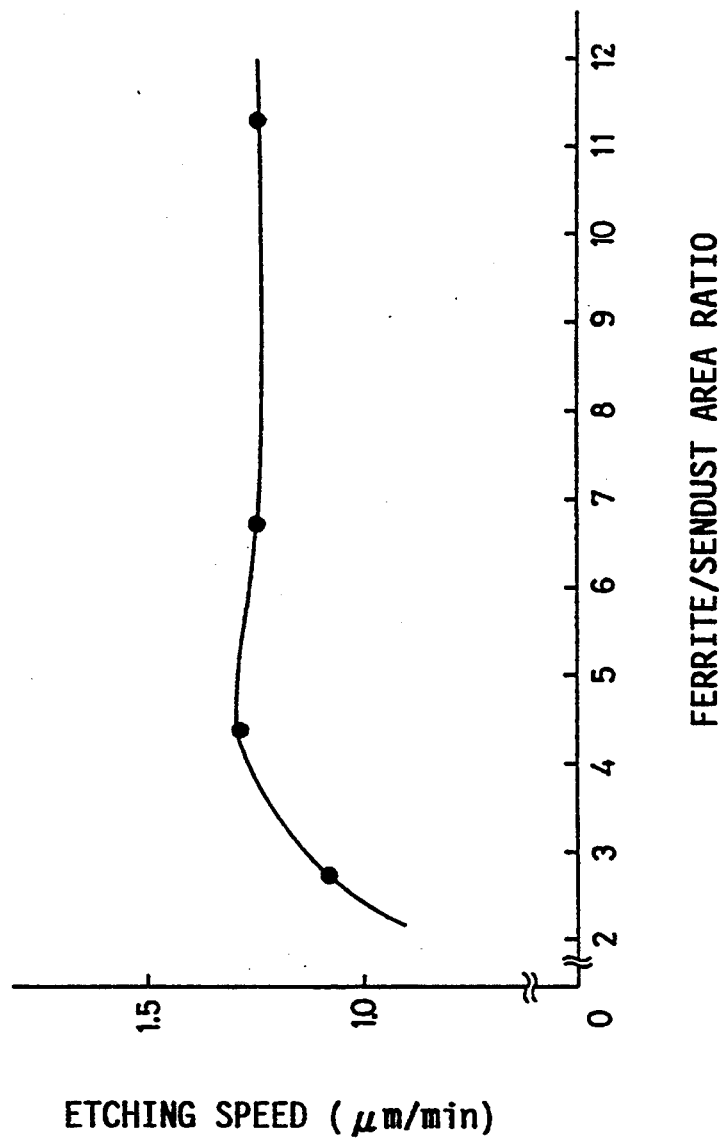
FIG. 5 is a graph indicating the etching speeds which varied with the ratio of the area of a Mn—Zn ferrite member contacting an etching liquid to the area of etched portions of a sendust film of Example 2.

It will be understood from the graph of FIG. 5 that the etching speed substantially increases with an increase in the ratio of the area of the Mn—Zn ferrite member 12 contacting the etching liquid to the total etched area of the sendust film 4. When this ratio was less than 2:1, the pattern obtained from the sendust film 4 was affected by abnormal etching which produced some non-etched portions defining the pattern, or caused poor conformity of edges of the etched portions of the film 4 to those of a desired predetermined pattern. When this ratio exceeds 12:1, the obtained sendust pattern was affected by abnormal etching which caused poor conformity of edges of etched portions of the film 4 to those of a desired predetermined pattern.

EXAMPLE 3

Initially, a 0.015 μm chromium base film and a 2.0 μm sendust film were successively formed by sputtering on a substrate made of a Mn—Zn ferrite. The chromium base film was formed of chromium having the purity of 99.999%, and the sendust film was formed of Sendust (Fe—Si—Al alloy) having a composition of 84.5% Fe-5.5% Al-10% Si.

After a predetermined resist pattern was formed on the sendust film on the substrate, according to the steps (b') through (d') as shown in FIG. 2, a Mn—Zn ferrite member was disposed so as to surround the ferrite substrate, and a chromium bulk having the purity of 99.9% was further disposed outside the ferrite member. The Mn—Zn ferrite member and chromium bulk were electrically connected to the ferrite substrate, chromium base film and sendust film, through a carbon paste.

The thus obtained assembly of the ferrite substrate, chromium base film, sendust film, Mn—Zn ferrite member and chromium bulk was immersed for 2 minutes in an etching liquid kept at 20° C., to effect etching on the sendust film. The etching liquid was a mixture of acid solutions of nitric acid and hydrochloric acid, in which $HNO_3:HCl=4:1$. The etching liquid was prepared by using a 61% solution of solution of nitric acid and a 36% of hydrochloric acid.

After etching the sendust film in the manner as described above, the same assembly was immersed for 2.5 minutes in a chromium-etching liquid kept at 20° C., to effect etching on the chromium base film. The chromium-etching liquid had a composition of $Ce(NH_4)_2\cdot(NO_3)_6 + HClO_4 + H_2O = 17$ g+5 cc+100 cc. Thereafter, the chromium base film was subjected to an extra 12-minute etching operation.

As Comparative Example, a sendust film and a chromium base film were subjected to respective etching operations, such that a ferrite substrate, chromium base film and sendust film were electrically connected only to a Mn—Zn ferrite member disposed around the substrate. That is, a chromium bulk was not disposed outside the Mn—Zn ferrite member. In this case, the etching on the chromium base film was only effected for 2.5 minutes.

With respect to the above-described two kinds of etched products, i.e., Example 3 and Comparative Example, the width of a sendust pattern obtained by etching the sendust film and the width of a chromium pattern obtained by etching the chromium base film were measured at three positions A, B and C on the substrate, where A and C indicate opposite end portions of the substrate and B indicates a middle portion of the substrate. The results of the measurement for these two examples are indicated in the graphs of FIG. 6 and FIG. 7, respectively.

Figure 6:
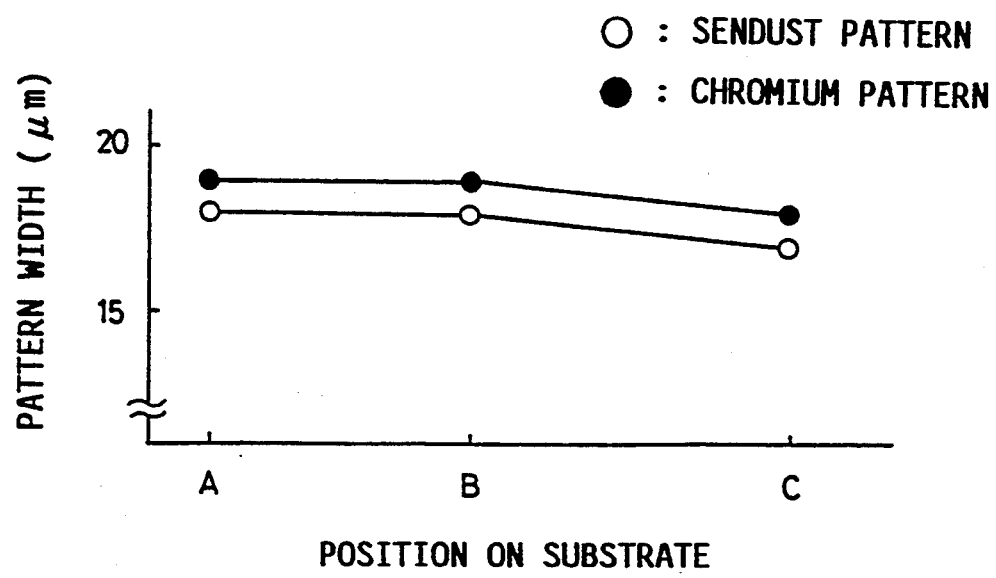
FIG. 6 is a graph indicating respective widths of a sendust pattern and a chromium pattern formed on an etched product of Example 3, for which a chromium base film was etched while being electrically connected to a chromium bulk.
Figure 7:
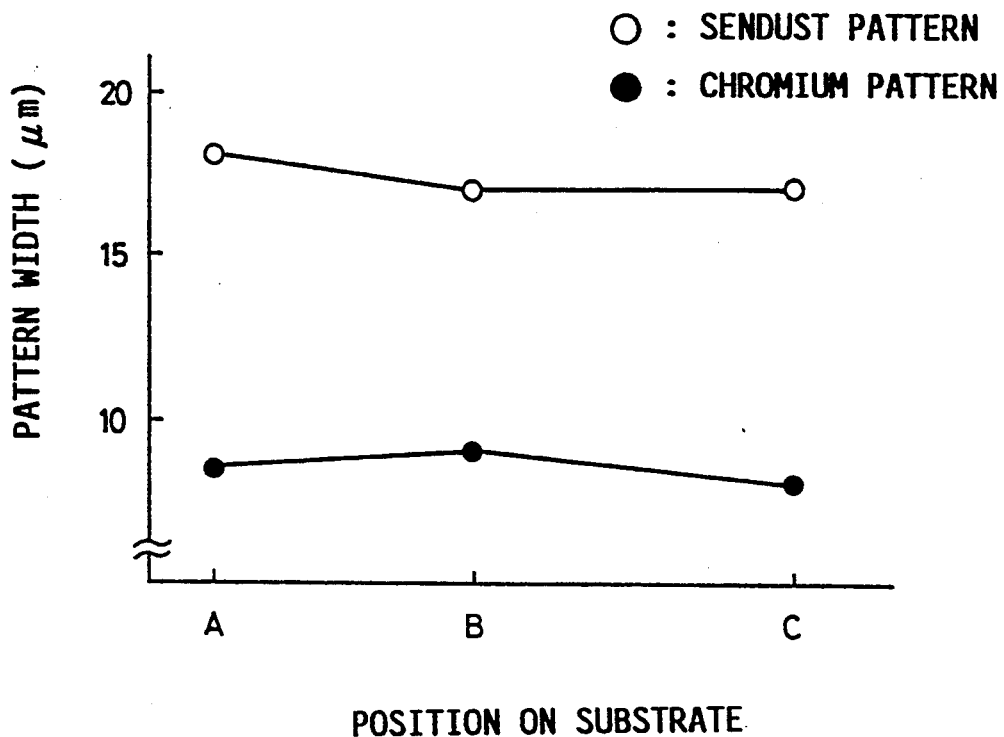
FIG. 7 is a graph indicating respective widths of a sendust pattern and a chromium pattern formed on an etched product of Comparative Example, for which a chromium base film was etched without being electrically connected to a chromium bulk.

More specifically, FIG. 6 indicates the respective widths of the sendust pattern and chromium pattern of the etched product of Example 3, for which the etching was effected while the chromium base film was electrically connected to the chromium bulk. It will be understood from FIG. 6 that the sendust film and chromium base film were etched into patterns having substantially the same width, irrespective of the extra 12-min. etching operation, thus effectively avoiding the conventional problem of reduction in the size of the chromium pattern as compared with that of the sendust pattern. In the Comparative Example in which the chromium base film was not electrically connected to the chromium bulk, however, the width of the chromium pattern was considerably reduced as compared with the width of the sendust pattern, as indicated in FIG. 7, thereby possibly causing some problems, such as separation or peeling-off of the patterned sendust film from the patterned chromium base film.

What is claimed is:

1. An etching method for etching a sendust film formed on a substrate, comprising the step of etching the sendust film using a mixture of acid solutions of nitric acid and hydrochloric acid, wherein said mixture is prepared such that a molar ratio of hydrochloric acid to nitric acid is within a range of 1:1 to 1:5.5.

2. An etching method as defined in claim 1, wherein said mixture of acid solutions comprises a nitric acid solution containing at least 40% by weight of the nitric acid, and a hydrochloric acid solution containing at least 24% by weight of the hydrochloric acid.

3. An etching method as defined in claim 1, wherein the etching is effected while said sendust film is directly or indirectly held in electrical connection with a ferrite member, with an area of a portion of said ferrite member which contacts said etching liquid being twice to twelve times a total area of etched portions of said sendust film.

4. An etching method as defined in claim 3, wherein said ferrite member is formed of Mn—Zn ferrite.

5. An etching method as defined in claim 3, wherein said sendust film is directly held in electrical connection with said ferrite member, through an electrically conductive material.

6. An etching method as defined in claim 5, wherein said electrically conductive material consists of a carbon paste.

7. An etching method as defined in claim 3, wherein said substrate is formed of a ferrite material, said sendust film being indirectly held in electrical connection with said ferrite member, through said ferrite material of the substrate.

8. An etching method for pattern-etching a sendust film, and a chromium base film formed between the sendust film and a substrate, comprising the steps of:
    etching said sendust film to form a sendust pattern; and
    etching said chromium base film to form a chromium pattern which conforms to said sendust pattern, such that said chromium base film is directly or indirectly held in electrical connection with a chromium bulk.

9. An etching method as defined in claim 8, wherein said chromium base film is directly held in electrical connection with said chromium bulk, through an electrically conductive material.

10. An etching method as defined in claim 9, wherein said electrically conductive material consists of a carbon paste.

11. An etching method as defined in claim 8, wherein said substrate is formed of a ferrite material, said chromium base film being indirectly held in electrical connection with said chromium bulk, through said ferrite material of the substrate.

12. An etching method as defined in claim 8, wherein said chromium bulk is formed of one of chromium and chromium-based alloys.

13. An etching method as defined in claim 8, wherein a mixture of acid solutions of nitric acid and hydrochloric acid is used as an etching liquid for etching said sendust film.

14. An etching method as defined in claim 13, wherein said mixture of acid solutions is prepared such that a molar ratio of hydrochloric acid to nitric acid is within a range of 1:1 to 1:5.5.

15. An etching method as defined in claim 13, wherein said mixture of acid solutions comprises a nitric acid solution containing at least 40% by weight of the nitric acid, and a hydrochloric acid solution containing at least 24% by weight of the hydrochloric acid.

16. An etching method as defined in claim 8, wherein said sendust film is etched such that the sendust film is directly or indirectly held in electrical connection with a ferrite member, and such that an area of a portion of said ferrite member which contacts said etching liquid is twice to twelve times a total area of etched portions of the sendust film.

17. An etching method as defined in claim 16, wherein said ferrite member is formed of Mn—Zn ferrite.

18. An etching method as defined in claim 16, wherein said sendust film is directly held in electrical connection with said ferrite member, through an electrically conductive material.

19. An etching method as defined in claim 18, wherein said electrically conductive material consists of a carbon paste.

20. An etching method for etching a sendust film formed on a substrate, comprising the steps of:
   electrically connecting a ferrite member to said sendust film; and
   etching said sendust film with a mixture of acid solutions while said sendust film is held in electrical connection with said ferrite member;
   wherein an area of a portion of said ferrite member which contacts said mixture of acid solutions is twice to twelve times a total area of etched portions of said sendust film.

* * * * *